3,152,067
REMOVAL OF SURFACTANTS FROM JET FUELS

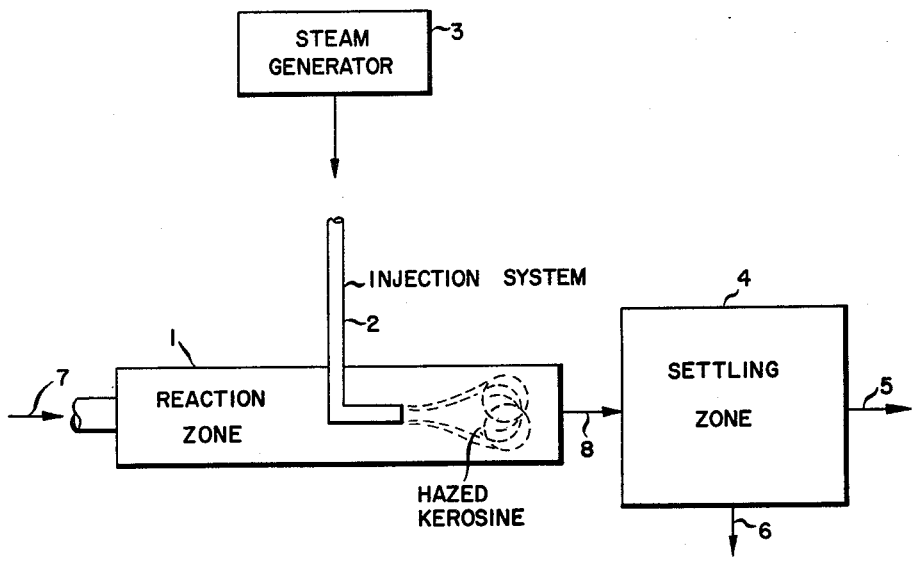

Thomas J. Akers and Thurston Skei, East Alton, Ill., assignors to Shell Oil Company, New York, N.Y., a corporation of Delaware
Filed Dec. 28, 1961, Ser. No. 162,778
6 Claims. (Cl. 208—177)

This invention relates to a process for treating aviation kerosene and other highly refined hydrocarbon fuels to remove small concentrations of surface-active contaminants contained therein. More particularly, this invention is directed to a process wherein there is an intimate mixing of a small amount of water with the hydrocarbon material containing the surface-active contaminants and subsequently settling the treated hydrocarbon phase and removing the surfactant-rich aqueous phase.

Modern field distribution systems for aviation kerosene and other aviation fuels are designed to maintain strict standard of cleanliness in the fuels delivered to the aircraft. Cleanliness in this sense means that the fuel must contain no more than traces of suspended solids or undissolved water. In quantitative terms, this ordinarily means that the fuel must contain no more than 0.25 mg./liter of solids which are removable by a filter with 0.8 micron pores. The fuel must also be free from any visible haze from dispersed water. Such a haze is ordinarily visible in the fuel when it contains as much as 30 p.p.m. dispersed water. Freedom from dirt and undesired water must be maintained to avoid abrasion of fuel pumps and plugging of fuel screens in the aircraft by particulate matter and ice.

Contaminants in parts per million and lower concentrations can cause serious operating problems in fuel distribution and transportation systems such as pipelines and the like. Water-soluble surface-active contaminants present in either kerosene or in various pipeline corrosion inhibitors can cause the water to become dispersed in the kerosene in fine invisible droplets that are not removed by normal settling. On passage of a fuel so contaminated through filter/separators provided in the field distribution systems, the coalescer elements thereof become fouled by the surfactants and partial coalescence of the contaminated droplets produces visible contamination of the fuel by dirty water commonly called "slime."

Because of the high ratio of fuel usage to storage capacity at large metropolitan airports, and because of the tendency to schedule most flights during relatively short periods in the morning and evening, settling periods in most airport fuel storage tanks barely meet the recommended minimum standard. Therefore, when surfactants are present in kerosene in concentrations of p.p.m. or less they can cause a dispersion throughout the fuel of fine invisible water droplets and can cause serious operating problems in field distribution systems. Since these droplets do not settle from the fuel in the normal settling periods provided at various intermediate and terminal storage areas, serious operating problems arise in field distribution systems. The rule of thumb conventionally followed to insure that the fuel settles adequately before being withdrawn from a storage vessel is that one hour of settling be allowed for each foot of product depth in the vessel. However, when the kerosene is contaminated by various surfactant materials, longer settling periods are often required to insure that the surfactant contaminated droplets are settled from the fuel. These delays in settling time result in serious bottlenecks in the distribution of the fuel.

Accordingly, it is an object of this invention to provide a process for the removal of surfactants from various types of aviation fuel. It is a further object of this invention to reduce the solids content in hydrocarbon jet fuels. Another object of the invention is to provide a method for improving fuel quality away from the refinery. Still another object of the invention is to provide clean fuel entering fuel supply and distribution systems and to increase filter/separator performance throughout the distribution system. A further object of the invention is to reduce the amount of settling time required in various fuel distribution systems. These and other objects and advantages of the invention will become apparent in the following description thereof which is made with reference to the accompanying drawing which consists of a single figure and is a schematic diagram of a preferred embodiment of the process.

The presence of surfactants in jet fuels causes a very fine invisible suspension of water drops to exist in the fuel. These droplets contain the surfactant materials in high concentrations. The surfactants tend to lower the interfacial tensions of the water against the fuel to a very low value, probably about one dyne/centimeter or less. This low interfacial tension apparently stabilizes the droplets against coalescence by collision and the small size of the droplets prevents their settling readily. Further, during filtration of the fuel, the surface-active component from the droplets tend to collect on the coalescer elements of the filter/separators and render the coalescer elements oleophillic and thus relatively ineffective in coalescing the suspended water droplets. It is believed that partial coalescence of the droplets from the down-stream side of these filter elements accounts for the "slime-like" appearance of the fuel after it has passed through a partially fouled filter separator.

It has now been discovered that the surfactant contaminants contained in kerosene and other aviation fuels can be effectively removed therefrom by the injection of steam into the surfactant-contaminated hydrocarbon phase and subsequent settling of the thus-treated hydrocarbon phase and removing the aqueous phase containing the surfactant material. This steam-injection process may be advantageously applied to a fuel distribution system at various points thereof immediately prior to quiescent periods in the distribution system.

The extent of contamination by surfactants is measured by interfacial tension of the fuel against 1 N NaOH or against an extract prepared by steaming the fuel and coalescing the suspended water. The following results of several experiments will serve to demonstrate the efficiency of the steam injection process of the invention.

The kerosene fuel was subjected to the instant steam injection process at two locations in a doctor treater process. The results of this test are set forth in Table I below.

TABLE I

*Effect of 1000 p.p.m. Steam in Removing Surface-Active Materials*

| Point at Which Kerosene Steam was Treated | 1,000 p.p.m. Steam Added | Settling Period before Testing (in Hrs.) | Interfacial Tension in Dynes/cm. (Kerosene Surfactant Test)[a] |
|---|---|---|---|
| Out of Doctor Treater | No | 0 | 1.4 |
|  | No | 6 | 1.6 |
|  | No | 144 | 4.2 |
|  | Yes | 6 | 6.7 |
| Into Petreco Unit | No | 0 | 2.4 |
|  | No | 144 | 24.0 |
|  | Yes | 6 | 21.7 |
| Out of Petreco Unit | No | 0 | 26.6 |
|  | No | 6 | 29.5 |
|  | No | 24 | 31.1 |
|  | Yes | 6 | 37.8 |
|  | No | 6+ clay[b] | 42.4 |

[a] Eight liters of kerosene is hazed with steam to 400 p.p.m. free water and the hazed sample is gravity fed through a glass fiber coalescer. The water is trapped and made up to a constant 2 ml. volume with distilled water. The interfacial tension of the recovered water versus the original kerosene is determined by the drop-volume method.

[b] After settling, the sample was contacted with 1 lb./bbl. of a filter-type clay and filtered.

It is obvious from the interfacial tension values set forth in Table I above that the addition of 1000 p.p.m. steam to kerosene at various points in the process produces a higher quality fuel than produced by the gravity settling period. It is further evident that the steam injection treatment is approximately equivalent to 144 hours' settling time. At the exit of the Petreco Unit, the most desirable treating location, 1000 p.p.m. steam produced a kerosene having an interfacial tension value of 37.8 dynes/cm. This interfacial tension value is 8.3 dynes/cm. better than the untreated sample, and it is close to the maximum interfacial tension value of 42.4 dynes/cm. obtained by clay treatment and filtration.

Three different field samples of kerosene were subjected to steam injection with 400 p.p.m. steam. The results of this test are set forth in Table II below.

TABLE II

*Effect of 400 p.p.m. Steam in Improving Kerosene Quality*

| Kerosene Sample | Interfacial Tension in Dynes/cm. | | |
|---|---|---|---|
|  | Existing Quality | Quality after Adding 400 p.p.m. Steam | Quality Gain |
| A | 16.4 | 22.5 | 6.1 |
| B | 19.9 | 24.8 | 4.9 |
| C | 37.6 | 43.7 | 6.1 |

It is apparent from the data set forth in Table II above that each sample subjected to the steam injection treatment of the instant invention had a higher interfacial value than the untreated sample. The average interfacial value improvement obtained with 400 p.p.m. steam was about 5.7 dynes/cm.

The results of a full-scale test made during kerosene movement in a product pipeline indicate that treating the fuel according to the process of the instant invention improved fuel quality. However, the degree of improvement appeared to be dependent upon two factors: (1) the quantity of the fuel treatment, and (2) the type of water treatment. For example, water was injected directly into a pipeline and the mixing was accomplished by turbulent flow. Injection of 1000 p.p.m. water into 74,000 barrels of kerosene prior to intermediate storage showed a 10 dyne/cm. interfacial tension value improvement over a similar untreated kerosene fuel. However, upon comparing steam- and water-injection methods, it was evident that the steam treatment yielded a fuel having approximately twice the quality of that treated by direct water injection.

When the instant steam injection process is in a system such as a pipeline, longer treating periods will often be required initially in order to remove surfactant contaminants from the pipeline walls. When the pipeline walls are free of the contaminating surfactant, maximum interfacial tension benefits in the fuel are achieved in relatively short periods when the steam injection process is used.

It is evident that the better the dispersion of introduced water into the fuel, the more efficient the treating process becomes. It was found that steam gave the best dispersion of any conventional mixing method. Therefore, a preferred embodiment of the invention is the injection of steam into the fuel by means of a steam-injection system. Steam has a further advantage in the instant process in that it is also the source of the water while also serving as the means of mixing the water with the fuel. The injection of steam into a fuel transportation system, such as a pipeline, provides a more intimate water dispersion in the fuel than conventional mixing methods. In addition, the field distribution steam-treating process of the invention provides a safeguard against irregularities in various refinery operations. Moreover, the instantly described steam-treating process also reduces the sodium level and the solids content of the treated fuels. Removal of these materials is currently done by various clay filtration processes. Therefore, it is obvious that the instantly described treatment of fuels in various fuel distribution systems provides a simple inexpensive method for improving kerosene quality away from the refinery which can be readily adapted to existing distribution systems. As discussed above, steam is the preferred method of removing the surfactant materials from the fuel. When steam is used, the pressure and temperature of the steam can vary from about 5 to about 300 p.s.i.g. and from about 220° F. to about 430° F., respectively.

The amount of steam or water injected into the fuel according to the instant invention should at least be sufficient to remove the aqueous surface-active containing suspensions from the fuel. In some cases a considerable excess over this amount may be used, especially when it is desired to remove the last traces of the more minute droplets from the fuel. The percent by weight of free water allowable in the kerosene during the treating process can range from about 100 p.p.m. to about 3000 p.p.m. In a preferred embodiment about 1000 p.p.m. free water is added to the kerosene to remove the surfactant contaminants. Steam in concentrations from about 100 p.p.m. to about 1000 p.p.m. is preferred. In a preferred embodiment of the invention steam is injected into the fuel at a concentration of about 400 p.p.m. When the steam is injected into a fuel distribution system, e.g., a pipeline, the pressure of the fuel can range from about 20 to about 150 p.s.i.g. with a temperature of from about 35 to 200° F. The quantity of fuel which can be treated according to the instant injection process ranges from about 100 to about 4000 bbl./hr. of fuel. The settling required after the instant steam-injection process ranges from about 0.5 hr./vertcial foot to about 1 hr./vertical foot of fuel treated.

The apparatus employed in this process may be any conventional or convenient type known to those skilled in the art. For simplicity, the drawing does not show all the pumps, tanks, heat exchangers, valves, by-passes, vents, condensers, coolers, and other auxiliaries that might be necessary for the proper operation of the process, but the inclusion of which will be evident to those skilled in the art.

Many different fuel mixtures may be treated by the instantly described steam/water injection of the present invention. However, a preferred embodiment of the invention is the removal of surface-active materials from jet fuels, particularly kerosene, by the injection of steam into the fuel mixture when it is being transported through fuel distribution systems such as pipelines. Although the process is particularly effective for the removal of invisible water droplets from various fuel mixtures, the process can also be operated effectively for the removal of certain solid contaminants.

Referring to the drawing, finished kerosene from various treating processes and/or field distribution systems such as pipelines is introduced by means of line 7 into treating zone 1 at a rate of about 3000 bbl./hr. and under a pressure of about 90 p.s.i.g. and a temperature of 300° F. Treating zone 1 is preferably a section of pipe provided with an injection system 2 and a steam generator 3. Steam generator 3 can be any conventional means of producing steam such as a boiler, flash boiler and the like. Injection system 2 can be any conventional spray type injection device such as nozzle, spray valve, and the like. The kerosene introduced into zone 1 is injected with 400 p.p.m. steam having a pressure of approximately 150 p.s.i.g. and a temperature of about 300° F. The resultant hazed kerosene is withdrawn from treating zone 1 by means of line 8 and introduced into settling zone 4 by means of line 8. After an appropriate settling time of approximately 0.5 hour per vertical foot of stored material, the surfactant-free kerosene is withdrawn from settling zone 4 by means of line 5. The surfactant-rich aqueous phase is removed from settling zone 4 by means of line 6 and discarded. The resultant hazed kerosene phase produced in zone 1 is shown by means of the dotted lines. In a second embodiment of the invention (not shown), water can be introduced into treating zone 1 directly, with treating zone 1 being equipped with a mixing device such as a rotating disc contactor as described in U.S. patent to Reman 2,601,674, issued June 24, 1952. It is understood, of course, that the instant steam injection process can be incorporated throughout the fuel distribution system to further improve the quality of the resultant aviation fuel with respect to surfactant material and the dispersion of minute water particles in the fuel.

Steam which is used to remove the surfactant contaminants from fuels can be broadly described as a decontaminating fluid.

We claim as our invention:

1. A method for removing water-soluble surfactant materials from aviation fuels being transported in fuel distribution systems comprising (1) passing the contaminated fuel through a treating zone, (2) introducing a decontaminating fluid, steam, into the treating zone to form a mixture of steam and fuel therein, (3) withdrawing the steam/fuel mixture from the treating zone and introducing said mixture into a settling zone, (4) withdrawing the treated fuel essentially free from water-soluble surfactant materials and the steam from the settling zone and reintroducing it into the fuel distribution system.

2. A process according to claim 1 wherein the decontaminating steam has a pressure from about 5 to about 300 p.s.i.g., and a temperature of from about 220° F. to about 430° F.

3. A process according to claim 2 wherein the steam is introduced into the fuel in a concentration from about 100 p.p.m. to about 3000 p.p.m.

4. A process according to claim 3 wherein the aviation fuel is kerosene.

5. A process according to claim 1 wherein the treating zone is a section of a pipeline in a fuel transportation system with a means for introducing the decontaminating medium provided in said pipeline.

6. A process according to claim 1 wherein the fuel in the transportation system is under a pressure from about 20 to about 150 p.s.i.g. and a temperature from about 35 to about 200° F.

References Cited in the file of this patent

UNITED STATES PATENTS

| | | |
|---|---|---|
| 2,366,936 | Schulze | Jan. 9, 1945 |
| 2,677,666 | Dougherty | May 4, 1954 |
| 2,789,083 | Hardy | Apr. 16, 1957 |

OTHER REFERENCES

Reinhold Pub. Corp., The Condensed Chemical Dict., 1956, page 752.

Guthrie: Petroleum Products Handbook, 1960, page 36.